US005677039A

United States Patent [19]

Perrin et al.

[11] Patent Number: 5,677,039

[45] Date of Patent: Oct. 14, 1997

[54] ANTISTATIC SHEET

[75] Inventors: Claude Perrin, Apprieu; Christophe Simon, Voiron, both of France

[73] Assignee: Arjo Wiggins S.A., France

[21] Appl. No.: 307,792

[22] PCT Filed: Mar. 29, 1993

[86] PCT No.: PCT/FR93/00310

§ 371 Date: Oct. 4, 1994

§ 102(e) Date: Oct. 4, 1994

[87] PCT Pub. No.: WO93/20280

PCT Pub. Date: Oct. 14, 1993

[30] Foreign Application Priority Data

Apr. 7, 1992 [FR] France .................................. 92 04230

[51] Int. Cl.$^{6}$ .............................. B24D 11/02; B32B 5/16; B32B 33/00; D21H 19/44; D21H 19/82; D21H 21/14

[52] U.S. Cl. .......................... 428/205; 162/135; 162/136; 162/138; 428/207; 428/537.5; 451/533

[58] Field of Search .................................... 162/135, 136, 162/138; 428/537.5, 205, 207; 451/535

[56] References Cited

U.S. PATENT DOCUMENTS

| | | |
|---|---|---|
| 4,568,609 | 2/1986 | Sato et al. . |
| 5,071,676 | 12/1991 | Jacobson . |

FOREIGN PATENT DOCUMENTS

| | | |
|---|---|---|
| 0 415 478 | 3/1991 | European Pat. Off. . |

OTHER PUBLICATIONS

Database WPIL, Section Ch, Week 8314, Derwent Publications Ltd., London, GB.

*Primary Examiner*—James C. Cannon
*Attorney, Agent, or Firm*—Bacon & Thomas

[57] ABSTRACT

According to the invention, it includes conductive pigments constituted by a substrate (chosen from the group including micas, talcum, kaolin, bentonites, montmorillionites or glass particles) which has a basic lamellar-type structure coated with an electroconductive layer of tin oxide doped with antimony. On at least one face, the sheet has a layer containing at least the conductive pigments having a basic lamellar-type structure and at least one hydrosoluble binder.

Application as decorative paper for laminates.

24 Claims, No Drawings

ANTISTATIC SHEET

Such a sheet can be used in various fields. It may be used to make articles for which there is a need to dissipate the electrostatic charges produced when they are used, or for articles whose primary or secondary function is to dissipate the electrostatic charges which develop and can be dangerous in a given environment.

Flexible abrasives are known that are made up of a substrate sheet onto which abrasive particles are glued with an adhesive, so that it is necessary to dissipate the electrostatic charges that arise during their use.

In effect, unless the abrasive is treated to dissipate the charges, the dust formed during the abrasion of an object is deposited and crushes the abrasive particles; this lowers the yield from the abrasion process. Moreover, workers can suffer electric shocks, which can cause uncontrollable gestures and put them in danger on the job.

Laminates are also known, which are currently used in making furniture, work tables, wall panels and the like.

The products obtained are used in particular in operating rooms, white rooms or computer rooms. In these rooms, there is a need to prevent dust from being retained, particularly as a result of the attraction exerted by electrostatic charges, and there is also a need to avoid sudden electrostatic discharge; hence the surfaces located in the room must be treated to provide for regular dissipation of the static electricity.

In the field of abrasives, the substrate or the adhesive layer, or the surface of the abrasive particles, is treated with a conductive product. Conductive products that have been employed are quaternary ammonium salts, carbon black, metal powders or fibers, metal alloys, metal salts, doped conductive polymers, or mineral pigments made conductive by coating them with an electroconductive layer of metal oxide.

It is known to use carbon black, either in bulk or on the surface, to make a conductive substrate.

In European Patent Application EP A 414 494, the abrasive is made conductive by incorporating carbon black in the adhesive used for gluing the abrasive particles.

In U.S. Pat. No. 3,942,959, the abrasive is made conductive by a layer of conductive compound, which may be a metal, metal alloy, metal pigment, salt or metal complex, this layer being deposited between two insulating layers. The conductive product may be placed on the back of the substrate, or on the face of the substrate (under the adhesive), or mixed with the adhesive or the particles.

In French Patent Application FR A 2276144, an abrasive is made conductive by depositing a conductive layer on top of the abrasive particles, the conductive product being graphite in particular.

In European Patent Application EP A 408 943, the abrasive is made conductive by treating the surface of the layer containing the abrasive particles with a solution containing a quaternary ammonium salt.

In European Patent Application EP A 398 580, the abrasive is made conductive by treating the surface of the layer containing the abrasive particles with a doped conjugated polymer, such as polythiophene, polyaniline, or polypyrrole.

In the field of laminates, the sheets of paper constituting them are treated with a conductive product.

First, Applicants wish to reiterate how laminates are manufactured in general, by distinguishing the two types of currently existing laminates, that is, those known as high-pressure laminates and those known as low-pressure laminates.

High-pressure laminates are produced from a core made up of a stack of sheets, generally of kraft paper, impregnated with heat-hardenable resin, in particular a phenolic resin.

Once the sheets of kraft paper have been impregnated with resin, they are dried and cut and then stacked on one another; the number of stacked sheets depends on the intended uses, and in general varies between 3 and 9.

Next, a decorative sheet is put in place; it may be combined with printed patterns or may be given an iridescent or metallic appearance and is impregnated with a heat-hardenable resin that does not darken when exposed to heat (a melamine-formaldehyde resin, for instance). A protective covering sheet or overlay, also impregnated with a resin but without a pattern and being transparent in the final laminate, is sometimes placed on top of the decorative sheet.

The stack of the various types of impregnated sheets is placed in a press provided with a metal sheet that imparts its surface appearance; the assembly is laminated under pressure and heat; an extremely hard unitary structure is obtained that has a decorative effect.

Low-pressure laminates are produced in a manner similar to high-pressure laminates, but the lamination of the decorative sheets is done directly on a wood particle board panel or any other basic substrate.

A third type of product exists, the finish foil, which also belongs to the category of decorative papers. This paper sheet, which is preimpregnated or postimpregnated (generally with a mixture of latex and melamine-formaldehyde resin) is intended to be glued onto a particle board or any other substrate.

In French Patent Application FR-A 2540041, a laminate is made conductive by making some of the sheets constituting the core conductive, by incorporating an electroconductive material such as carbon black, a metal, metal salts, or conductive fibers into each sheet.

In French Patent Application FR-A 2557167, conductive fibers are dispersed in a paper to obtain a conductive laminate. These fibers are carbon fibers, metal fibers or fibers covered with a metal.

In Japanese Patent Application JP-A 58 034 861, a conductive pigment is described as an antistatic agent for plastics, the conductive pigment being obtained by depositing tin or indium onto a basic mineral, nonconductive pigment, followed by heating in an oxygen atmosphere to form its oxide. Hence the metal oxide is not doped.

Numerous pigments are named as being usable basic pigments, but no advantage whatsoever associated with a particular pigment or a geometrical form of a family of pigments is mentioned.

In U.S. Pat. No. 5,071,676, a conductive pigment is described that can be used to lend antistatic properties to cardboard papers. This pigment is constituted by a nonconductive substrate covered with an electroconductive tin oxide layer doped with antimony, which in turn is covered with a layer that lends the pigment an isoelectric point between 5 and 9 in order to facilitate its dispersion. The substrate may be of any arbitrary kind and is not critical to that invention.

European Patent Application A 415478 describes a colored and conductive pigment that can be used in laminated papers.

This pigment is constituted by a basic pigment of rutile and mixed-phase titanium dioxide, coated with a layer of tin oxide doped with antimony. The rutile has a spherical geometric form; hence this pigment is spherical.

All these conductive products mentioned above have various disadvantages.

The major disadvantage of carbon black is that black products are obtained, which may be a problem from an aesthetic standpoint and means that the products cannot be printed in the way one might wish.

A disadvantage of certain products, such as doped polymers, is their high cost.

A disadvantage of certain products, such as quaternary ammonium salts, is that it gives the articles excessively low conductivity, for the sake of a good flow of the electric static charges.

Another disadvantage of conductive salts is that the level of conductivity in the products containing them varies with the relative humidity.

A disadvantage of certain conductive products, such as aluminum, is the sensitivity to water; in the presence of water, a dangerous discharge of hydrogen occurs. Hence they cannot easily be used in an aqueous medium.

Disadvantages associated with the use of conductive fibers are the veined or tinted appearance given to the paper, especially when carbon fibers are used, on the one hand, and the worsening of the physical characteristics of the sheet of paper on the other.

Certain mineral conductive pigments that are made conductive by a layer of metal oxide can lend an overly slight conductivity in order to assure good dissipation of the electrostatic charges, especially when employed in a papermaking application.

The applicant proposes to overcome the aforementioned disadvantages.

The object of the invention is to furnish a sheet of paper that has a sufficient level of electrical conductivity to lend it antistatic properties.

One skilled in the art knows by experience that if an article is to effectively dissipate electrostatic charges, its surface resistivity should preferably be no higher than approximately $10^7$ ohms, measured by ASTM Standard 257–66.

A second object is to furnish a sheet having antistatic properties that can be made entirely in an aqueous medium.

A third object is to furnish a sheet having antistatic properties that do not vary with the relative humidity.

A fourth object is to furnish a sheet having antistatic properties which has a neutral aesthetic appearance; that is, the product that makes the sheet conductive should change the appearance of the sheet only slightly, if at all.

Another object is to furnish a sheet having antistatic properties whose mechanical characteristics are good.

A further object is to furnish a sheet having antistatic properties which has a relatively low cost.

The applicant has found that the objects of the invention are attained by making a sheet which includes conductive pigments having a basic lamellar-type structure and which are provided with an electroconductive layer of doped metal oxide.

As mentioned above, the mineral pigments covered with doped metal oxides are known for their electroconductive properties; however, the applicants have discovered that, for pigments having an electroconductive layer based on the same oxide and for the same dopant, which accordingly a priori has intrinsically comparable levels of conductivity, the sheets of paper including these pigments have quite different final conductivities depending on the basic structure (geometrical form) of the pigment substrate of the layer.

Such results are shown in accompanying Table 1; where the doped metal oxide is chosen as tin oxide doped with antimony, this doped oxide is deposited on substrate pigments of different geometrical forms.

The conductive pigments were laid down in an aqueous medium under the same conditions with the aid of the same binder (polyvinyl alcohol or PVA), and in the same ratio of 1:1, on the surface of a sheet of paper.

The surface resistivity of the sheets was measured by ASTM Standard 257–66 for a relative humidity of 50% (the conductivity of the sheets can be obtained by taking the inverse of the resistivity).

From this investigation, it appears that the basic structure of the pigment did have an influence on the final conductivity of the sheet. The desirable resistivity level, in order to have good dissipation of electrostatic charges (less than $10^7$ ohms), is attained only with pigments having a lamellar basic structure (hence a flat geometrical form); the resistivity is in fact on the order of $10^5$ ohms.

The invention accordingly furnishes a sheet of paper having antistatic properties characterized in that it includes conductive pigments having a basic lamellar-type structure and provided with an electroconductive layer of doped metal oxide.

Preferably, the doped metal oxide is a tin oxide doped with antimony.

According to the invention, the pigments having a lamellar-type structure are chosen, for example, from the group including micas, talcum, kaolin, bentonites, montmorillionites or glass particles.

In a particular embodiment of the invention, the conductive pigment is a mica coated with a layer of tin oxide doped with antimony.

The mica pigments covered with a layer of antimony-doped tin oxide have good transparency to light and do not change the aesthetic appearance of the paper that includes them.

In another particular embodiment of the invention, the conductive pigment is a mica covered with a layer of titanium oxide, optionally a layer of silica, and coated with a layer of tin oxide doped with antimony. These pigments have a certain iridescence, but they affect the aesthetic appearance of the paper in which they are contained only slightly. It may be valuable to use them in fields where the decorative effective of the iridescence is sought, as in the field of laminates.

The conductive pigments may be incorporated in bulk at the time the sheet is manufactured on the papermaking machine, or may be deposited on the surface of the sheet by impregnation with a glue spreader press, or by any coating means or by printing. Preferably, the conductive pigments are added in an aqueous medium.

Preferably, the sheet is characterized in that on at least one face it has a layer containing at least said conductive pigments and at least one binder.

The binder is a binder typically used in papermaking, such as hydrosoluble binders, latexes, etc.

It may be advantageous to use a hydrosoluble binder, such as polyvinyl alcohols or starches, for example, to obtain an easily repulpable sheet.

The layer may optionally include other additives typically used in papermaking, such as viscosity-regulating agents such as carboxymethylcellulose, anti-foaming agents, etc.

Preferably, the quantity of conductive pigments deposited onto the sheet is between 1 and 10 $g/m^2$, in dry weight.

The treated sheet is based on cellulose fibers; it may include other organic fibers (polyethylene, polypropylene, polyester fibers, etc.) or mineral fibers (such as glass fibers). It may also include other additives used in papermaking, such as fillers, gluing agents, binders, moisture resistance agents, retention agents, anti-foaming agents, viscosity-regulating agents, pH-regulating agents, and so forth.

The invention also furnishes a flexible abrasive product having antistatic properties that is characterized in that its substrate is this sheet with antistatic properties.

The abrasive may naturally be in sheet form but may also be in other forms, such as a continuous strip, a disk, etc.

The sheet used preferably includes the conductive pigments on the surface. The conductive pigments may be on the back of the abrasive or on the face that carries the particles, under the adhesive.

Since it is known to use a conductive product in the adhesive or on the particles, the use of conductive pigments in this way can be contemplated.

The invention also relates to a decorative sheet obtained from this sheet having anti-static properties.

The invention also relates to a laminate having antistatic properties, which is characterized in that it includes at least one sheet within the laminate is a sheet with antistatic properties. This sheet may be used as a component of the core of the laminate, or as a decorative sheet, or optionally as an overlay.

This sheet may also be a finish foil.

The following examples show possible embodiments of a sheet according to the invention; they also demonstrate that the surface resistivity (hence conductivity) does not vary, or varies only very slightly, with the relative humidity.

EXAMPLE 1

On a sheet of paper, an aqueous composition of conductive pigments of the mica type coated with antimony-doped tin oxide, available on the market from Merck, and starch as a binder is laid down, using a Meyer bar. The ratio of pigments to binder is 5:1.

A similar composition, but where the binder is a PVA, is laid down on another sheet.

Samples are made having different coating weight of conductive pigments (expressed in dry weight in the table below).

The surface resistivity of each sample is measured by the ASTM Standard 257-66, at relative humidity rates (abbreviated R. H.) of 50% and 20%. The results in the table below show that the resistivity of the sheet does not vary with the relative humidity.

The color of the sheets of papers obtained according to the invention remains unchanged.

| Binder | Starch | | | PVA | |
|---|---|---|---|---|---|
| Pigment coating weight ($g/m^2$) | 6.0 | 4.6 | 2.2 | 5.7 | 2.75 |
| Surface resistivity at 50% R.H. (ohms) | $1.2 \times 10^5$ | $5.1 \times 10^5$ | $6.3 \times 10^5$ | $2 \times 10^5$ | $3.6 \times 10^5$ |
| Surface resistivity at 20% R.H. (ohms) | $1.6 \times 10^5$ | $3.8 \times 10^5$ | $6.7 \times 10^5$ | $2 \times 10^5$ | $3.7 \times 10^5$ |

EXAMPLE 2

Samples are made as in Example 1, but a mica covered with a layer of titanium oxide and then a layer of silica and finally coated with a layer of tin oxide doped with antimony, the ratio of tin to antimony being 85:15, is used as the conductive pigment. This pigment is commercially available from Merck.

| Binder | Starch | | | PVA | |
|---|---|---|---|---|---|
| Pigment coating weight ($g/m^2$) | 6.0 | 4.1 | 1.9 | 7.4 | 5.0 |
| Surface resistivity at 50% R.H. (ohms) | $0.9 \times 10^5$ | $2.6 \times 10^5$ | $12 \times 10^5$ | $6 \times 10^4$ | $1.3 \times 10^5$ |
| Surface resistivity at 20% R.H. (ohms) | $0.8 \times 10^5$ | $2.6 \times 10^5$ | $15 \times 10^5$ | $9 \times 10^4$ | $2.0 \times 10^5$ |

As shown by the results in the table below, it is confirmed that the relative humidity does not influence the level of conductivity of the sheets obtained by the invention.

The sheets have a slight iridescence, which has little effect on their aesthetic appearance.

TABLE 1

| Substrate of the conductive layer / Substrate structure | Titanium oxide Spherical (0.02–0.1 μm) | | Titanium oxide Spherical (0.02–0.1 μm) | | Mica Lamellar | | Mica/Titanium oxide Silica Lamellar | |
|---|---|---|---|---|---|---|---|---|
| Quantity of pigments deposited, dry ($g/m^2$) | 2.80 | 3.75 | 2.50 | 3.40 | 2.80 | 3.70 | 2.80 | 3.80 |
| Surface resistivity at 50% R.H. (ohms) | $2.6 \times 10^9$ | $2.5 \times 10^8$ | $1 \times 10^8$ | $1.8 \times 10^7$ | $5.7 \times 10^5$ | $3.8 \times 10^5$ | $7 \times 10^5$ | $6 \times 10^5$ |

We claim:

1. A sheet of paper having antistatic properties the surface resistivity (hence conductivity) of which varies slightly if at all with variations in relative humidity, and having on at least one face of the sheet a layer containing conductive pigments and a binder, wherein the conductive pigments have a basic lamellar-type structure and are provided with an electroconductive layer of doped metal oxide, said sheet of paper being capable of providing antistatic properties to laminates when used as a lamina layer thereof.

2. The sheet of claim 1, characterized in that the conductive pigments having a lamellar-type structure are chosen from the group consisting of micas, talcum, kaolin, bentonites, montmorillionites, and glass particles.

3. The sheet of claim 1, characterized in that the doped metal oxide is a tin oxide doped with antimony.

4. The sheet of claim 2, characterized in that the conductive pigment is a mica coated with a layer of tin oxide doped with antimony.

5. The sheet of claim 2, characterized in that the conductive pigment is a mica covered with a layer of titanium oxide, optionally a layer of silica, and coated with a layer of tin oxide doped with antimony.

6. The sheet of claim 1, characterized in that the quantity of said conductive pigments deposited onto the sheet is between 1 and 10 $g/m^2$, in dry weight.

7. A laminate having antistatic properties comprising the sheet of paper of claim 1.

8. A laminate having antistatic properties comprising the sheet of paper of claim 2.

9. A laminate having antistatic properties comprising the sheet of paper of claim 3.

10. A laminate having antistatic properties comprising the sheet of paper of claim 4.

11. A laminate having antistatic properties comprising the sheet of paper of claim 5.

12. A laminate having antistatic properties comprising the sheet of paper of claim 6.

13. A decorative sheet having antistatic properties, comprising the sheet of paper of claim 1.

14. A decorative sheet having antistatic properties, comprising the sheet of paper of claim 2.

15. A decorative sheet having antistatic properties, comprising the sheet of paper of claim 3.

16. A decorative sheet having antistatic properties, comprising the sheet of paper of claim 4.

17. A decorative sheet having antistatic properties, comprising the sheet of paper of claim 5.

18. A decorative sheet having antistatic properties, comprising the sheet of paper of claim 6.

19. A flexible abrasive comprising as its substrate a sheet of paper having antistatic properties the surface resistivity (hence conductivity) of which varies slightly if at all with variations in relative humidity, the sheet of paper having on at least one face a layer containing conductive pigments and a binder, wherein the conductive pigments have a basic lamellar-type structure and are provided with an electroconductive layer of doped metal oxide, said sheet of paper providing antistatic properties to the flexible abrasive.

20. The flexible abrasive of claim 19, wherein the conductive pigments having a lamellar-type structure are chosen from the group consisting of micas, talcum, kaolin, bentonites, montmorillionites and glass particles.

21. The flexible abrasive of claim 19, characterized in that the doped metal oxide is a tin oxide doped with antimony.

22. The flexible abrasive of claim 20, characterized in that the conductive pigment is a mica coated with a layer of tin oxide doped with antimony.

23. The flexible abrasive of claim 20, characterized in that the conductive pigment is a mica covered with a layer of titanium oxide, optionally a layer of silica, and coated with a layer of tin oxide doped with antimony.

24. The flexible abrasive of claim 19, characterized in that the quantity of said conductive pigment deposited onto the sheet is between 1 and 10 $g/m^2$, in dry weight.

* * * * *